(12) United States Patent
Parapadakis

(10) Patent No.: US 7,702,517 B2
(45) Date of Patent: Apr. 20, 2010

(54) ACTIVE AND CONTEXTUAL RISK MANAGEMENT USING RISK SOFTWARE OBJECTS

(75) Inventor: George Parapadakis, Pennyland (GB)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 10/887,806

(22) Filed: Jul. 12, 2004

(65) Prior Publication Data

US 2006/0010496 A1    Jan. 12, 2006

(51) Int. Cl.
*G06Q 99/00*    (2006.01)

(52) U.S. Cl. ......................................................... 705/1

(58) Field of Classification Search .................. 705/1
See application file for complete search history.

(56) References Cited

U.S. PATENT DOCUMENTS

| | | | |
|---|---|---|---|
| 6,338,074 | B1 | 1/2002 | Poindexter et al. |
| 6,675,127 | B2 | 1/2004 | LaBlanc et al. |
| 2002/0059466 | A1 | 5/2002 | Poindexter et al. |
| 2003/0018490 | A1* | 1/2003 | Magers et al. ................ 705/1 |
| 2003/0160818 | A1* | 8/2003 | Tschiegg et al. ............ 345/743 |
| 2005/0192963 | A1* | 9/2005 | Tschiegg et al. ............... 707/9 |

OTHER PUBLICATIONS

"FileNet Content Manager" <http://www.filenet.com/English/Products/Content_Manager/Index.asp> (visited Jun. 14, 2004), 8 pages.

Aon eSolutions, "Homepage", [online], [retrieved on Jun. 20, 2008], retrieved from the Internet at <URL: http://www.aonriskconsole.com/en>, 1 pp.
Aon Inc., "Enterprise Risk Management Solutions", [online], © 2008, [retrieved on Jul. 3, 2008], retrieved from the Internet at <URL: http://www.aon.com/risk-services/enterprise-risk-mgmt.jsp>, 1 pg.
Aon Inc., "Homepage", [online], © 2008, [retrieved on Jun. 20, 2008], retrieved from the Internet at <URL: http://www.aon.com/default.jsp>, 2 pp.
Compli, "Home Page", [online], [retrieved on Jun. 20, 2008], retrieved from the Internet at <URL: http://www.compli.com>, 1 pp.
International Search Report and Written Opinion, Jun. 23, 2008, for PCT/US05/15257, 9 pp.
MB Risk Management, "Home Page", [online], © 1988-2008, [retrieved on Jun. 20, 2008], retrieved from the Internet at <URL: http://www.mbrm.com/htmls/main.html>, 1 pp.

(Continued)

*Primary Examiner*—Jonathan Ouellette
(74) *Attorney, Agent, or Firm*—Janaki K. Davda; Kondrad Raynes & Victor LLP

(57) ABSTRACT

A risk management system may include a memory system that may contain a plurality of risk software objects, each of which represents a risk associated with an enterprise and which is configured to contain attributes and methods. The memory system may include a plurality of non-risk software objects, each of which represent something associated with the enterprise other than a risk, as well as a relationship between one of the risk software objects and one of the non-risk software objects. A computer processing system may be configured to manage the software objects and the relationship. Relationships may also be with workflow processes. Numerous variations, as well as related processes and computer-readable media are also disclosed.

51 Claims, 3 Drawing Sheets

OTHER PUBLICATIONS

M-Bryonic Solutions, "Oriel", [online], © 2006, [retrieved on Jul. 3, 2008], retrieved from the Internet at <URL: http://www.m-bryonic.com/uk/Oriel>, 1 pp.

Methodware Ltd., "Homepage", Last updated Jun. 5, 2008, [retrieved on Jun. 20, 2008], retrieved from the Internet at <URL: http://www.methodware.com>, 1 pp.

Noweco Ltd., "RiskDecision Risk Management Software", © 2007, [retrieved on Jun. 20, 2008], retrieved from the Internet at <URL: http://www.noweco.com'emse.htm>, 3 pp.

Occusoft Corp., "Home Page", [online], © 2005, [retrieved on Jun. 20, 2008], retrieved from the Internet at <URL: http://www.occusoft.com>, 1 pp.

Risk Governance Ltd., "Home Page", [online], [retrieved on Jul. 3, 2008], retrieved from the Internet at <URL: http://www.riskgovernance.com>, 2 pp.

RiskTrak International, "Home Page", [online], [retrieved on Jun. 20, 2008], retrieved from the Internet at <URL: http://www.risktrak.com>, 2 pp.

SAS Insititute Inc., "SAS Credit Risk Management for Banking", [online], © 2008, [retrieved on Jul. 3, 2008], retrieved from the Internet at <URL: http://www.sas.com/industry/banking/credit/index.html>, 2 pp.

Strategic Thought Group, "Home Page", [online], © 2007, [retrieved on Jun. 20, 2008], retrieved from the Internet at <URL: http://www.strategicthought.com>, 2 pp.

International Preliminary Report, Mar. 5, 2009, for International Application No. PCT/US2005/015257, 5 pp.

AIIM—The ECM Association, "FilNet Minimizes Burden of Records Management Decisions with FileNet Records Manager", [online], 2005. [Retrieved on Jan. 2, 2008]. Retrieved from the Internet at <URL: http:www.aiim.org/article-docrep.asp?ID=28516>, 5 pp., reference not prior art.

* cited by examiner

| 201 | Risk Software Object | | 205 |
|---|---|---|---|
| 203 | Attributes | Methods | 233 |
| 207 | Name | Rules | 235 |
| 209 | Description | Status Changes | 237 |
| 211 | Type | Timed Events | 239 |
| 213 | Ownerships | External Events | 241 |
| 215 | Audits | Triggered Updates | 243 |
| 217 | Electronic Signatures | Aggregate Updates | 245 |
| 219 | Notifications | Notifications | 247 |
| 221 | Security | Escalations | 249 |
| 223 | Losses | Audits | 251 |
| 225 | Status | Reports | 253 |
| 227 | Value | Trends & Forecasts | |
| 229 | Dates | | |
| 231 | Relationships | | |

ACTIVE AND CONTEXTUAL RISK MANAGEMENT USING RISK SOFTWARE OBJECTS

BACKGROUND

1. Field

This application relates to risk management, to systems and methods that manage risk, and to content, process, document and records management systems.

2. Related Art

Many risk control systems are built on flat databases that are merely used to record and monitor a catalog of risks. Information concerning the status of these management efforts is typically entered manually into the risk control system. The actual management of the risks is typically handled outside of these systems.

Frequently, the risk database that is used in these systems lags behind the actual risk circumstances and adds little value to the risk management process, other than to create a record for compliance purposes. Losses that are associated with these risks also often tend to be kept separately.

At the same time, there has been a growing need to properly control operational risks. Regulatory authorities are tightening up on the required degree of controls, including regulations such as the Basel Accord II, the FSA Risk Framework, and the Turnbull Report/Common Code of Practice.

In short, there is a growing need to be proactive in the management of risk, to reduce and mitigate risk, to reduce the capital needed to cover risk, to better control the processes associated with risk, to more promptly identify risk, to move business rules management away from legacy systems, and to transfer the management of risks to the owners of them.

SUMMARY

A risk management system may include a memory system containing a plurality of risk software objects, each of which represents a risk associated with an enterprise and which is configured to contain attributes and methods. The memory system may include a plurality of non-risk software objects, each of which represent something associated with the enterprise other than a risk, and a relationship between one of the risk software objects and one of the non-risk software objects. The risk management system may include a computer processing system configured to manage the software objects and the relationship.

The computer processing system may be configured to trigger a process in response to a change in one of the risk software objects. The process may be specified by a method associated with the risk software object that is changed.

The computer processing system may be configured to cause a change in one of the risk software objects upon the occurrence of an event.

The event may be one that occurs outside of the risk management system.

The event may be one that occurs within the risk management system. The event may be based on the passage of a period of time.

The relationship may be represented by a link object.

The relationship may be represented as an attribute of the risk software object that is related by the relationship.

The computer processing system may be configured to allow a user of the risk management system to define the risk software objects.

The non-risk software object that may be related by the relationship may represent a person.

The non-risk software object that may be related by the relationship may represent a policy.

The non-risk software object that may be related by the relationship may represent an asset.

The non-risk software object that is related by the relationship may represent a transaction.

The non-risk software object that may be related by the relationship may represent a loss.

The non-risk software object that may be related by the relationship may include a document.

One of the attributes of one of the risk software objects may represent a loss that may be associated with the risk.

The computer processing system may be configured to grant a user exclusive access to a risk software object that the user is changing.

The computer processing system may be configured to generate and store an audit trail relating to accesses that are made to the risk software objects.

The computer processing system may be configured to allow each risk software object to be changed a plurality of times by a user of the risk management system and to allow each risk software object to be reconstructed to each of its states prior to each of the changes.

The memory system may include a plurality of workflow processes relating to the enterprise and a relationship between one of the risk software objects and one of the workflow processes. The computer processing system may be configured to manage the workflow processes and the relationship.

The memory system may include a relationship between two of the risk software objects, and the computer processing system may be configured to manage this relationship.

The computer processing system may be configured to allow the user of the risk management system to navigate to a software object based on its relationship to another software object.

The memory system may include a template for a risk software object, and the processing system may be configured to allow a user of the risk management system to define a risk software object based on the template. The template may have been based on one of the risk software objects, and the processing system may be configured to allow a user of the risk management system to create a template based on one of the risk software objects.

A process for managing a plurality of risks associated with an enterprise in a computer processing system may include defining a risk software object that is configured to include attributes and methods to represent each risk. The process may include defining each of a plurality of non-risk software objects to represent something associated with the enterprise other than a risk, establishing a relationship between one of the risk software objects and one of the non-risk software objects, and managing the risks using the software objects, the relationship and the computer processing system.

Computer-readable media may contain programming that, when installed in a computer processing system, allows a user of that computer processing system to define a risk software object configured to include attributes and methods to represent each risk in an enterprise. The programming may also allow the user to define each of a plurality of non-risk software objects to represent something related to the enterprise other than a risk, establish relationships between the risk software objects and the non-risk software objects, and manage the risks using the software objects and the relationships.

A risk management system may include a memory system containing a plurality of risk software objects, each of which represents a risk associated with an enterprise and which is configured to contain attributes and methods. The memory system may include a plurality of workflow processes relating to the enterprise and a relationship between one of the risk software objects and one of the workflow processes. The risk management system may include a computer processing system configured to manage the risk software objects, the workflow processes and the relationship.

The computer processing system may be configured to trigger one of the workflow processes in response to a change in one of the software objects. The triggerable, workflow process may be specified by a method associated with the risk software object that is changed.

The computer processing system may be configured to cause a change in one of the risk software objects upon the occurrence of an event.

The computer processing system may be configured to execute a user-defined process upon the occurrence of an event.

The event may be one that occurs outside of the risk management system.

The event may be one that occurs within the risk management system. The event may be based on the passage of a period of time.

The relationship may be represented by a link object.

The relationship may be represented as an attribute of the risk software object that is related by the relationship.

The computer processing system may be configured to allow a user of the risk management system to define the risk software objects.

The computer processing system may be configured grant a user exclusive access to a risk software object that the user is changing.

The computer processing system may be configured to generate and store an audit trail relating to accesses that are made to the risk software objects.

The computer processing system may be configured to allow each risk software object to be changed a plurality of times by a user of the risk management system, and to allow each risk software object to be reconstructed to each of its states prior to each of the changes.

The memory system may include a template for a risk software object, and the processing system may be configured to allow a user of the risk management system to define a risk software object based on the template. The template may have been based on one of the risk software objects, and the processing system may be configured to allow a user of the risk management system to create a template based on one of the risk software objects.

A process for managing a plurality of risks associated with an enterprise using a computer processing system may include defining a risk software object to represent each risk and configured to contain attributes and methods in a computer processing system. The process may include defining a plurality of workflow processes relating to the enterprise, establishing a relationship between one of the risk software objects and one of the workflow processes, and managing the risks using the risk software objects, the workflow processes and the relationship using the computer processing system.

Computer-readable media may contain programming that, when installed in a computer processing system, allows a user of that computer processing system to define a risk software object configured to contain attributes and methods to represent each risk in an enterprise, define a plurality of workflow processes relating to the enterprise, establish relationships between the risk software objects and the workflow processes, and manage the risks using the risk software objects, the workflow processes and the relationships.

A risk-management system may include a content management system and a process management system. The risk management system may include a computer processing system configured to allow risks to be defined as risk software objects that are related to the content and process management systems and that are configured to contain attributes and methods.

The content and process management systems may be part of a single, integrated system.

The content and process management systems may be separate systems.

The risk management system may include a document management system, and the computer processing system may be configured to allow the risks that are defined as risk software objects to be related to the document management system.

The computer processing system may be configured to allow the risk software objects to be declared as records that are managed by a records management system.

The process management system may include a workflow management system.

A risk management system may include a memory system containing a plurality of risk software objects, each of which represents a risk associated with an enterprise and which is configured to contain attributes and methods. The memory system may include multiple relationships between two of the risk software objects that were defined by one or more users of the risk management system. The risk management system may also include a computer processing system configured to manage the risk software objects and the multiple relationships.

A process for managing a plurality of risks associated with an enterprise may include defining a risk software object that is configured to include attributes and methods to represent each risk in a computer processing system. The process may include establishing under the direction of one or more users of the risk management system multiple relationships between two of the risk software objects in the computer processing system, and managing the risks using the risk software objects, the multiple relationships and the computer processing system.

Computer-readable media may contain programming that, when installed in a computer processing system, allows a user of that computer processing system to define a risk software object configured to include attributes and methods to represent each risk in an enterprise. The programming may allow the user to establish under the direction of one or more users of the risk management system multiple relationships between two of the risk software objects, and manage the risks using the software objects and the multiple relationships.

A risk management system may include a memory system containing a plurality of risk software objects, each of which represents a risk associated with an enterprise and which is configured to contain attributes and methods. The risk management system may include a computer processing system configured to allow a user to be granted exclusive access to a risk software object that the user is changing. The computing processing system may be configured to allow each risk software object to be changed a plurality of times by a user of the risk management system, to allow each risk software object to be reconstructed to each of its states prior to each of the changes, and to allow the access users of the risk management system have to the risk software objects to be regulated.

A process for managing a plurality of risks associated with an enterprise may include defining a risk software object that is configured to include attributes and methods to represent each risk in a computer processing system. The process may include granting a user exclusive access to one of the risk software objects that the user is changing, reconstructing one of the risk software objects that was changed by a user to its state prior to the change, and blocking a user from access to some but not all of the risk software objects.

Computer-readable media may contain programming that, when installed in a computer processing system, allows a user of that computer processing system to define a risk software object that is configured to include attributes and methods to represent each risk in an enterprise, grant a user exclusive access to one of the risk software objects that the user is changing, reconstruct one of the risk software objects that was changed by a user to its state prior to the change, and block a user from access to some but not all of the risk software objects.

These as well as still further features, objects, benefits, advantages, components and steps will now become clear upon a review of the Detailed Description of Illustrative Embodiments and the accompanying drawings.

DETAILED DESCRIPTION OF ILLUSTRATIVE EMBODIMENTS

Figure 1:
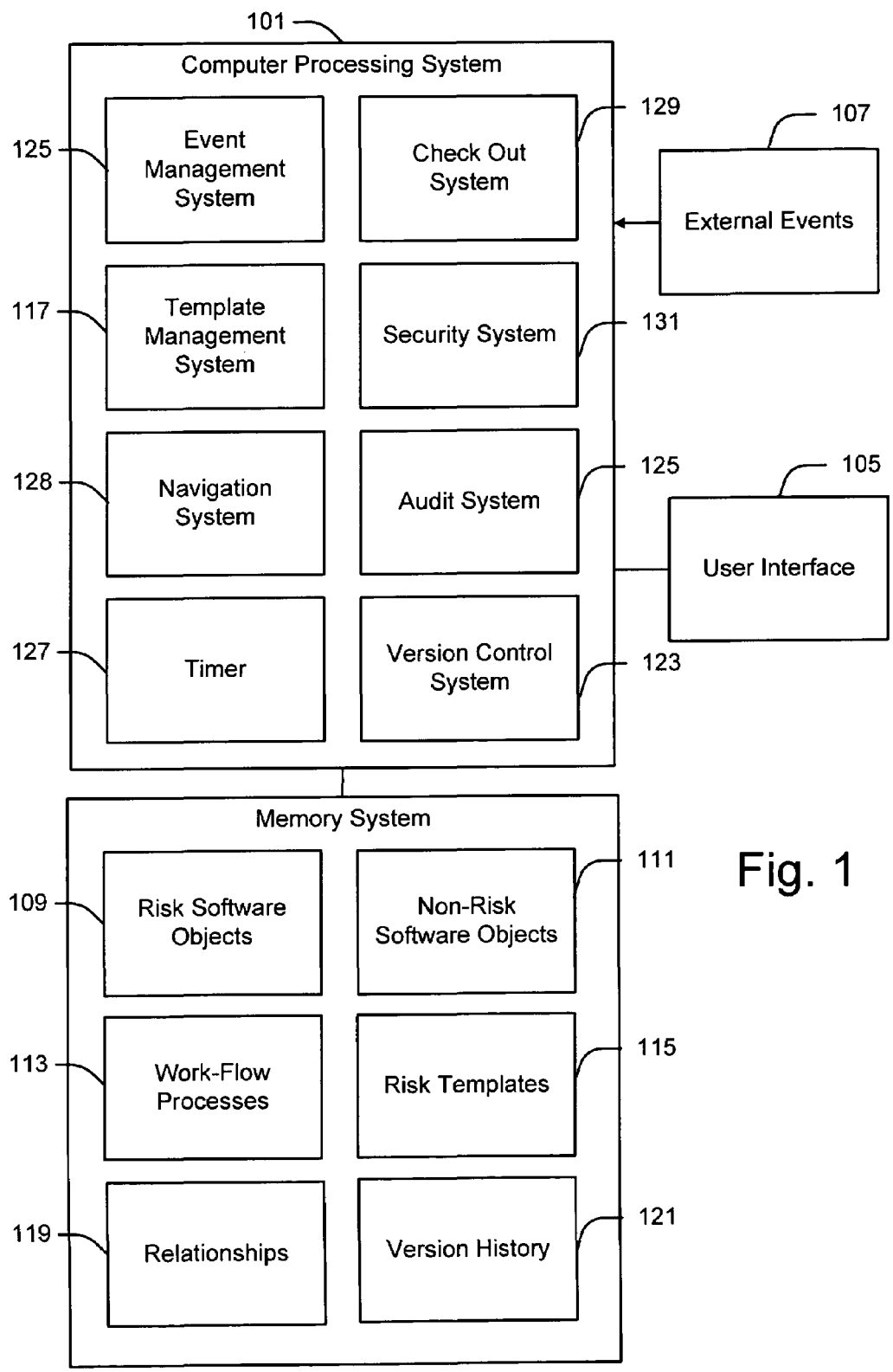
FIG. 1 illustrates a risk management system in which risks are defined as software objects.

FIG. 1 illustrates a risk management system in which risks are defined as software objects. As shown in FIG. 1, a computer processing system 101 may operate in conjunction with a memory system 103, a user interface 105 and external events 107.

The computer processing system 101 may be configured to perform any or all portions of the functions described in this application, as well as other functions. For example, the computer processing system 101 may be configured to manage the various components in the system, including the various objects, processes and relationships that are discussed below. The computer processing system 101 may be configured to create, delete and modify any or all of these components.

The computer processing system 101 may be constructed from any type of computer processing system and may include computer hardware and/or software. The computer processing system 101 may include a general purpose computer or a computer that is dedicated to the risk management system. The computer processing system 101 may include a single computer or multiple computers and/or processors. When using multiple computers and/or processors, the multiple computers and/or processors may be at a single location or at several locations. When using multiple computers and/or processors, the multiple computers and/or processors may be interconnected by a network system, such as a local area network, a wide area network, and/or the Internet. The computer processing system 101 may include any combination of these embodiments.

The memory system 103 may include any type of memory system, including one or more hard disk drives, magnetic tape drives and/or RAMs. The memory system 103 may consist of a single device or multiple devices. When multiple devices are used, they may all be at the same location or at different locations. When multiple devices are used, appropriate hardware and/or software may be used to facilitate their intercommunication.

Any one of the functions that are performed by the computer processing system 101 may be performed in response to input from the user interface 105 that originates with one or more users of the risk management system. The user interface 105 may include any type of user interface components, including one or more keyboards, mice and/or display screens. The user interface 105 may include appropriate software to process information. The user interface 105 may include communication links to other computing systems and/or databases.

The memory system 103 may contain a plurality of risk software objects 109. Each software object may represent a risk associated with an enterprise, such as a business or other type of organization. One example of a risk software object is discussed below in connection with FIG. 2.

The memory system 103 may include a plurality of non-risk software objects 111. Each non-risk software object may represent something associated with the enterprise other than a risk. Examples of non-risk software objects are discussed below in connection with FIG. 3.

The memory system 103 may include a plurality of workflow processes 113. Each workflow process may represent a workflow process relating to the enterprise. The workflow process may be a fully automated workflow process or one that requires human intervention at one or more stages of the process. Processes related to the enterprise other than workflow processes may also be stored in the memory system 103.

Various risk templates 115 may be stored in the memory system 103 and managed by a template management system 117 in the computer processing system 101. Each template may represent a particular type of risk. Under the control of the template management system 117, the user of the risk management system may create one or more risk templates 115 from which new risk software objects may be created. Each risk template may impose structures and/or associated processes for the risk object that is created based upon that template, thus facilitating consistency and comprehensive treatment of risks that are created from the template. The template management system 117 may be configured to allow the user to create one of the risk templates 115 based on an existing risk software object.

The memory system 103 may include a plurality of relationships 119. Each relationship may specify an association between two or more components in the risk management system, such as between two or more of the risk software objects 109 and/or between one of the risk software objects 109 and one or more of the workflow processes 113.

One or more of the relationships 119 may be an indirect relationship. For example, a relationship may be established between one of the workflow processes 113 and a particular type of risk software object, as defined by one of the risk templates 103. In this instance, each of the risk software objects 109 that are produced from this risk template may be indirectly related to this workflow process.

The computer processing system 101 may be configured to allow the user operating through the user interface 105 to create, modify and/or delete one or more of the risk software objects 109, non-risk software objects 111, and/or relationships 119.

The memory system 103 may include a version history 129 which is created and managed by a version control system 123 in the computer processing system 101. As changes are made to one or more of the components in the risk management system, such as to one or more of the risk software objects 109, the version control system 123 may retain information in the version history 121 that will allow each component to be reconstructed to each of its states prior to each of the changes that are made to it. The information that is stored in the version history 121 may include complete replicates of earlier component versions and/or merely information indicative of the changes that are made thereto.

The processing system 101 may include an event management system 125. The event management system may be configured to cause one or more processes to be implemented and/or to be altered during their implementation in response to one or more detected events.

A broad variety of events may be detected. For example, one of the external events 107 may be detected, such as the arrival of a document or claim and/or a change in a market price. Internal events may also be detected, such as a change to one of the risk software objects 109. Certain events may also be triggered by the passage of time, such as periodic reviews, timed communications, diary events, risk deadlines and expiries, and time-based SLAs. A timer 127 in the computer processing system 101 may be used to provide the timing in connection with such timed events.

A broad variety of processes may be implemented in response to events. These processes may be stored separately, such as in the form of one or more of the workflow processes 113. They may also be stored as part of the risk software objects 109, as will become more clear in connection with the discussion below of FIG. 2.

One type of process can be to issue notifications. The risk management system may be configured to allow internal and/or external users (or organizations) to subscribe to individual risk software objects for the purpose of being notified whenever certain characteristics of the object change or when certain processes are initiated or completed. Notifications may be sent by e-mail or through the automated generation of letters.

Escalations may also be handled by the event management system 125. When an attribute of a risk exceeds or declines below a certain threshold value and appropriate actions have not been instigated or completed, such an event may be used by the event management system 125 to automatically launch escalation processes that may minimize or capitalize upon the impact of such changes.

Events and their triggered processes may be cascaded. For example, an event may trigger a first process which, in turn, may cause an event that triggers a second process.

A check out system 129 may be employed in the computer processing system 101 to grant the user of the risk management system exclusive access to a risk software object that the user is in the process of changing.

A security system 131 may be employed in the computer processing system 101 to govern who has access to particular risk software objects and the components that may be related to them. The security may be applied at various levels, including to groups of users and/or particular classes of information.

An audit system 125 may be included in the computer processing system 101 to keep an audit of accesses that are made, including accesses to the risk software objects 109. The audit system 125 may keep track of who access an object, when it is modified, who authorizes the modification, who generates documentation related to the object, and when these events take place. All of this information may be reported on for auditing and compliance reporting purposes.

A navigation system 128 may be included in the computer processing system 101 to allow a user of the risk management system to navigate from one component of the system, such as from a risk software object, to other components that are related to it. The navigation system 128 may include functionality that allows all relationships to a particular component, such as to a risk software object, to be displayed, and to allow the user to select from this display the next component with which the user wishes to work.

The risk management system may include a different combination of components, as well as additional components. For example, the risk management system may include a life cycle management system that manages the life cycle of each risk software object, such as managing status transitions in the object, review and approval levels, version control, security, retention periods, expiry dates and electronic sign-offs.

External management systems may be linked to the risk management system.

The risk management system may include a rules-based regulatory reporting system. Regulatory reporting controls may be used to monitor risk status and plan scheduled activities. Exception reporting may be controlled automatically by the system, once risks meet (or fail to meet) certain predefined criteria. Business rules may be combined with automated processes to support automatic notifications and exception escalation.

Trends and forecasts may be reported. Using process analyzer and simulation tools, trends and patterns in risk management may be identified and explored with what-if scenarios.

Risk dependencies across departments in the enterprise may be analyzed. Using an enterprise-wide repository with a consistent method for managing risk, users may extend the concept of risk association to expose risks that are dependent on other risks or assets that are managed by different departments. One example may be fire on a property that is related to business liability on a business housed on that property. Another example is to associate medical conditions with car insurance.

Figures 2, 3:
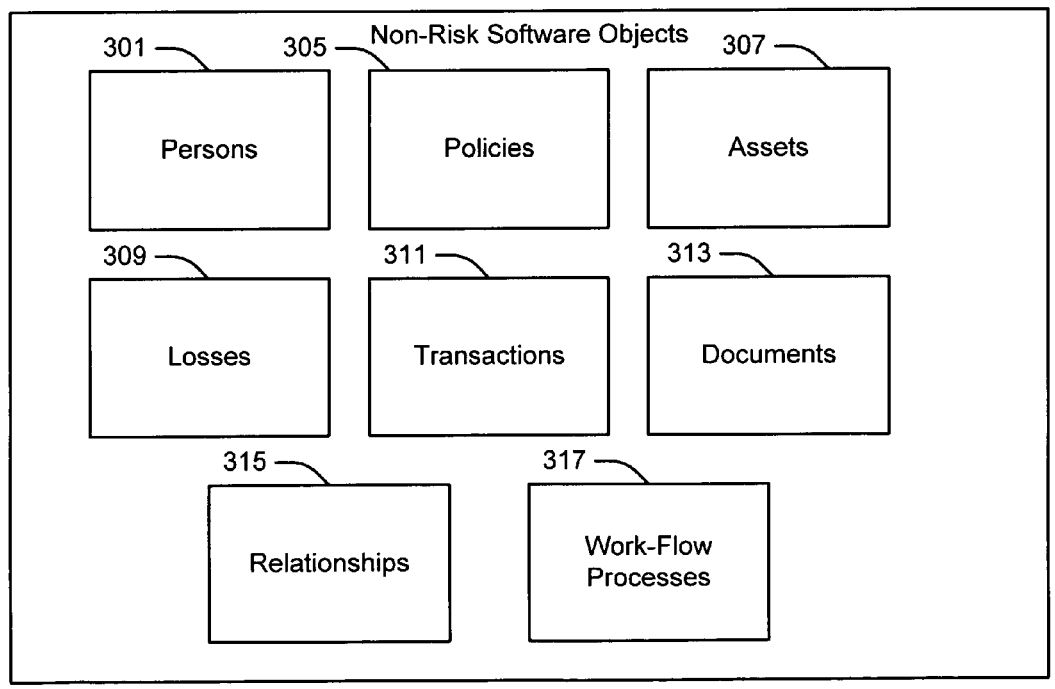
FIG. 2 illustrates a type of risk software object that may be used in the risk management system shown in FIG. 1.
FIG. 3 illustrates types of non-risk software objects that may be used in the risk management system shown in FIG. 1.

FIG. 2 illustrates a type of risk software object that may be used as one of the risk software objects 109 shown in FIG. 1. As shown in FIG. 2, the risk software object 201 may be configured in conformance with the classic model of a software object that has been developed in object-oriented programming to include one or more attributes 203 and one or more methods 205.

A broad variety of characteristics may be assigned as attributes 203 to the risk software object. The examples shown in FIG. 2 include attributes that are related to the risk that is embodied in the risk software object such as a name 207 for the risk, a description 209 of the risk, the type 211 of the risk, an identification of the owners 213 of the risk, audit information 215 relating to the risk software object, electronic signatures 217 that may have been procured in connection with the risk software object, notifications 219 that should be issued upon a change in an aspect of the risk software object, security information 221 relating to the risk software object, information about losses 223 that have been sustained in connection with the risk, status information 225 that is associate with the risk software object (such as under evaluation, accepted, rejected and/or loss occurred), information indicative of the value 227 of the risk, relevant dates 229 (e.g., creation date, expiry date, and/or key risk timelines, including multiple, periodic or cyclical information), and relationships 231 between the risk software object and other components. The relationships may be between the risk software object and one or more other risk software objects, non-risk software objects, workflow processes, or external references.

Although each of these characteristics are illustrated in FIG. 2 as an attribute 203 of the risk software object 201, each of these may also or instead be stored as separate components or objects in the risk management system.

FIG. 2 similarly illustrates examples of methods 205 that may be related to the risk software object 201, including methods that include or relate to rules 233, status changes 235, timed events 237, external events 239, triggered updates 241, aggregate updates 243, notifications 245, escalations 247, audits 249, reports 251 and trends and forecasts 253. Each of these may constitute software subroutines that initiate, alter or interrupt one or more processes. As with the attributes 203, the methods 205 may be stored separately from the risk software object 201 in another object or component.

FIG. 3 illustrates types of non-risk software objects that may be used as one or more of the non-risk software objects 111 in the risk management system shown in FIG. 1 and that may be related to one or more of the risk software objects 109. As shown in FIG. 3, these non-risk software objects may include persons 301 (e.g., owners of risks and risk managers), policies 305, assets 307 (e.g., buildings or other property), losses 309, transactions 311, documents 313 (e.g., insurance policies), relationships 315 and workflow processes 317. Each non-risk software object may be in the form of the classical software object known to object-oriented programming that includes both attributes and methods.

The risk management system may be configured to explore the associations between one or more of the risk software objects and one or more of the non-risk software objects.

The system may also be configured alert one or more users of the risk management system who are responsible for the management of one or more of the non-risk software objects to the existence of one or more of the associated risk software objects and the corresponding relationships between one or more of the non-risk and one or more of the risk software objects.

Using the navigation functionality described above, a user of the risk management system may transition between the management of one or more of the non-risk software objects and the management of one or more of the risk software objects that are associated with them.

Relating one or more of the risk software objects to the management of one or more of the non-risk software objects may be referred to as "Contextual Risk Management".

As should now be clear from a review of FIGS. 1-3, the same component may appear in one or several of many different ways in the risk management system. For example, a relationship may take the form of a separate component in the memory system 103, such as the relationships 119. Relationship may in addition or instead be attributes of a risk software object 201, such as the relationships attribute 231. They may instead be non-risk software objects, such as the relationships 315 shown in FIG. 3.

Similarly, workflow processes may be defined in the system as separate components, such as the workflow processes 113 shown in FIG. 1, as one or more of the methods 205 in the risk software object 201, and/or as one or more of the non-risk software objects shown in FIG. 3, such as the workflow processes 317.

These are but a few examples of the infinite variations that may be implemented.

Figure 4:
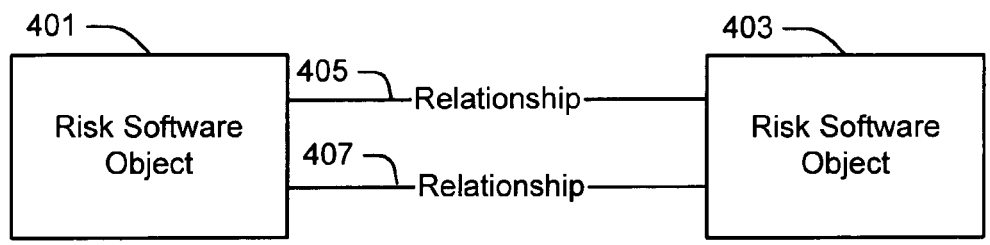
FIG. 4 illustrates multiple relationships between two risk software objects.

FIG. 4 illustrates multiple relationships between two risk software objects. As shown in FIG. 4, a risk software object 401 may be related to a risk software object 403 with a plurality of relationships, such as by a relationship 405 and a relationship 407. Additional relationships may also be established. This multiple-relationship model between two risk software objects may be used in connection with the risk management system shown in FIG. 1.

Although not illustrated, multiple relationships may also be established by the user between one or more of the risk software objects 109 and one or more of the non-risk software objects 111 and/or one or more of the workflow processes 113.

Figure 5:
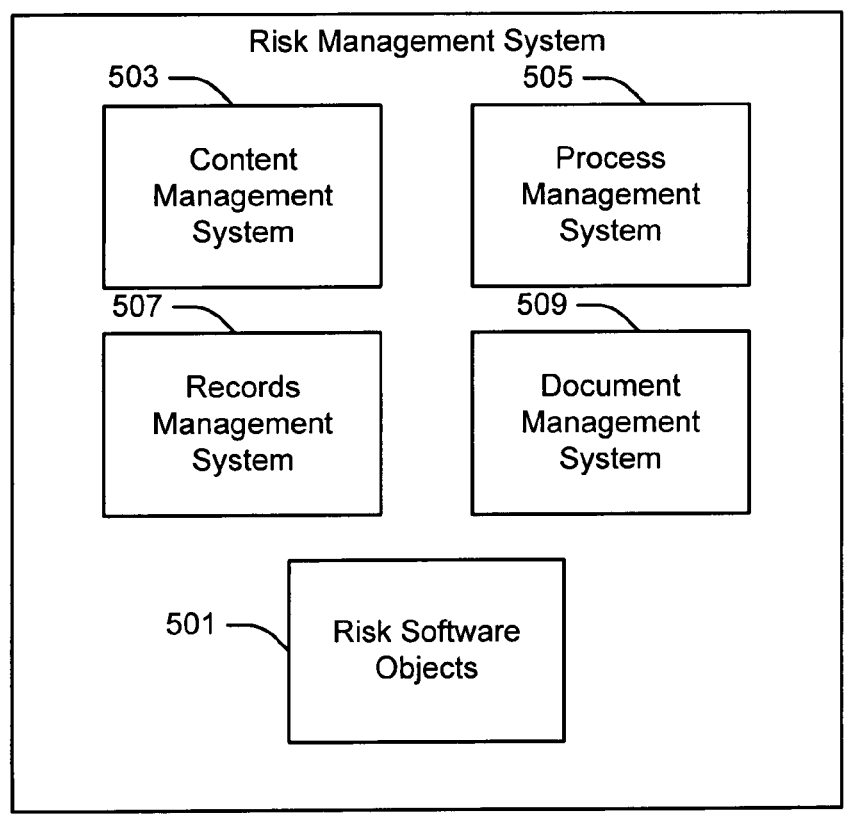
FIG. 5 illustrates a risk management system in which risks are defined as software objects and in which the risk software objects are managed by various types of object management systems.

FIG. 5 illustrates a risk management system in which risks are defined as software objects and in which the risk software objects are managed by various types of object management systems. As shown in FIG. 5, risk software objects 501 may be managed by a content management system 503, a process management system 505, a records management system 507 and a document management system 509. These systems may be collectively configured to create one or more of the structures and/or to implement one or more of the processes that are discussed above in connection with the risk management systems shown in FIGS. 1-4. A different combination of management systems and/or additional types of management systems may also be employed.

The various management systems that are shown in FIG. 5 may, in whole or in part, be consolidated into a single, integrated management system, such as an integrated content management system and process management system. Alternatively, one or more of the various management systems may be separate, stand-alone systems that have been brought together and integrated merely for the purpose of creating the risk management system.

The records management system 507, the process management system 505 and the risk software objects 501 shown in FIG. 5 may be configured to monitor the value(s) of one or more attributes of one or more of the risk software objects 501. In response to this monitoring and based on one or more pre-defined rules and/or conditions, the risk management system may be configured to automatically initiate one or more processes in the process management system 505. One or more of these processes, in turn, may declare one or more of the risk software objects 501 or other information associated with one or more of these objects to be a record in the records management system 507. One or more of these processes may in addition or instead classify one or more records in the records management system 507 and/or apply one or more pre-defined retention periods to one or more of them.

The automatic application of records management process in response to changes in one or more attributes of one or more risk software objects may be referred to as "Zero-Click Records Management." This approach may also be applied in response to changes in one or more non-risk software objects.

A broad variety of risks may be managed in a broad variety of ways using one or more of the systems and processes that are described above.

For example, the departure of an employee from a company may be defined as one risk.

Associated with that risk may be a set of rules. For example, one rule might be that no single employee may be assigned projects having a collective value in excess of $200,000. If this rule is violated, for example, a re-assignment process might be triggered.

Another rule that might be associated with this risk is that no single project should carry a risk above $70,000. If this rule is violated, the occurrence of such an event might trigger a risk review process.

After the user defines this risk, these rules, and these associated processes, the risk management system may implement these processes in an automated fashion in accordance with the rules.

For example, the risk management system may record that project A carrying a risk of $50,000 has been assigned to employee X. Since this event does not violate any rule, no process is initiated as a result.

Later, the risk management system may record that project B has also additionally been assigned to employee X and that project B carries a risk of $80,000. The risk management system will detect that this violates the rule against a single project carrying a risk above $70,000. In turn, the risk management system will initiate the associated risk review process. In turn, this may result in a notification being sent to a manager of the problem. The manager may then sub-divide the project into two smaller projects and reassign the set.

Additional projects may then be assigned to employee X that cause a violation of the rule against any single employee carrying a risk of over $200,000. This will trigger the re-assignment process. Again, a notification may be sent to a manager of the problem who, in turn, may reassign the risk to another employee.

Monitoring conditions associated with one or more of the risk software objects and automatically initiating relevant actions in response may be referred to as "Active Risk Management".

The foregoing is but a simple example of how an embodiment of the risk management system may be configured to automatically and effectively manage a risk of an enterprise. A more comprehensive system may manage hundreds or risks and involved hundreds of associated persons, processes, events, etc.

The features, objects, benefits, advantages, components and steps that have been discussed are merely illustrative and are not to be interpreted as limiting the scope of protection in any way. Numerous other embodiments are also contemplated, including embodiments that have fewer, more, and/or different features, objects, benefits, advantages, components and/or steps. The components and/or steps may also be arranged or ordered differently. In short, the scope of protection is limited solely by the claims that now follow. In these claims, the phrases "means for" and "step for" are intended to embrace the corresponding structure, material and acts that are described herein and to their equivalents. Conversely, the absence of either phrase is intended to mean that the claim is not limited to any such corresponding structure, material or acts.

I claim:

1. A risk management system comprising:
a memory system containing:
a plurality of risk software objects developed with object-oriented programming to contain attributes and methods, wherein the attributes of a risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and other risk software objects, non-risk software objects, and workflow processes, wherein the methods include methods that relate to rules, status changes, events, and updates, wherein a method comprises a subroutine that initiates, alters or interrupts one or more processes;
a plurality of non-risk software objects, each of which represent something associated with the enterprise other than a risk, wherein the non-risk software objects include persons, policies, assets, losses, transactions, documents, relationships, and workflow processes; and
a computer processing system including a processor and configured to manage the software objects and the relationship by:
causing a change in one of the risk software objects upon the occurrence of an event; and
in response to the change in the risk software object, triggering a workflow process, wherein the workflow process is specified by a method associated with the risk software object that is changed.

2. The risk management system of claim 1 wherein the event is one that occurs outside of the risk management system.

3. The risk management system of claim 1 wherein the event is one that occurs within the risk management system.

4. The risk management system of claim 3 wherein the event is based on the passage of a period of time.

5. The risk management system of claim 1 wherein the relationship is represented by a link object.

6. The risk management system of claim 1 wherein the computer processing system is configured to define the risk software objects.

7. The risk management system of claim 1 wherein one of the attributes of one of the risk software objects represents a loss that may be associated with the risk.

8. The risk management system of claim 1 wherein the computer processing system is configured to grant a user exclusive access to a risk software object that the user is changing.

9. The risk management system of claim 1 wherein the computer processing system is configured to generate and store an audit trail relating to accesses that are made to the risk software objects.

10. The risk management system claim 1 wherein the computer processing system is configured to allow each risk software object to be changed a plurality of times by a user of the risk management system and to allow each risk software object to be reconstructed to each of its states prior to each of the changes.

11. The risk management system of claim 1 wherein:
the memory system includes:
a plurality of workflow processes relating to the enterprise; and
a relationship between one of the risk software objects and one of the workflow processes; and
the computer processing system is configured to manage the workflow processes and the relationship.

12. The risk management system of claim 1 wherein:
the memory system includes a relationship between two of the risk software objects; and
the computer processing system is configured to manage the relationship.

13. The risk management system of claim 1 wherein the computer processing system is configured to:
display relationships to a first software object; and in response to user selection from the display, navigate to a second software object based on its relationship to the first software object.

14. The risk management system of claim 1 wherein:
the memory system includes a plurality of templates, wherein each of the templates represents a particular type of risk; and
the computer processing system is configured to:
receive input from a user of the risk management system;
in response to the input, define a new risk software object based on a template from the plurality of templates, wherein a relationship is established between a workflow process and a particular type of risk software object as defined by the template, and wherein the new risk software object that is produced from the template is indirectly related to the workflow process.

15. The risk management system of claim 14 wherein:
the template was based on one of the risk software objects; and
the computer processing system is configured to create a template based on one of the risk software objects.

16. Computer-readable media containing programming that, when installed in a computer processing system, allows that computer processing system to:
define a risk software object developed with object-oriented programming to contain attributes and methods, wherein the attributes of the risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and other risk software objects, non-risk software objects, and workflow processes, wherein the methods include methods that relate to rules, status changes, events, and updates, wherein a method comprises a subroutine that initiates, alters or interrupts one or more processes;
define each of a plurality of non-risk software objects to represent something related to the enterprise other than a risk, wherein the non-risk software objects include persons, policies, assets, losses, transactions, documents, relationships, and workflow processes;
establish the relationships between the risk software objects and the non-risk software objects, wherein a relationship is represented as an attribute of the risk software object that is related by the relationship; and
manage the risks using the software objects and the relationships by:
causing a change in one of the risk software objects upon the occurrence of an event; and
in response to the change in the risk software object, triggering a workflow process, wherein the workflow process is specified by a method associated with the risk software object that is changed.

17. The computer-readable media of claim 16 containing programming that, when installed in a computer processing system, allows that computer processing system to:
display relationships to a first software object; and
in response to user selection from the display, navigate to a second software object based on its relationship to the first software object.

18. The computer-readable media of claim 16 containing programming that, when installed in a computer processing system, allows that computer processing system to:
store a plurality of templates, wherein each of the templates represents a particular type of risk; and
receive input from a user of the risk management system;
in response to the input, define a new risk software object based on a template from the plurality of templates, wherein a relationship is established between a workflow process and a particular type of risk software object as defined by the template, and wherein the new risk software object that is produced from the template is indirectly related to the workflow process.

19. A risk management system comprising:
a memory system containing:
a plurality of risk software objects developed with object-oriented programming to contain attributes and methods, wherein the attributes of a risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and other risk software objects, non-risk software objects, and workflow processes, wherein the methods include methods that relate to rules, wherein a method comprises a subroutine that initiates, alters or interrupts one or more processes;
a plurality of workflow processes relating to the enterprise;
and
a computer processing system including a processor and configured to manage the risk software objects, the workflow processes and the relationship by:
causing a change in one of the risk software objects upon the occurrence of an event; and
in response to the change in the risk software object, triggering the workflow process, wherein the workflow process is specified by a method associated with the risk software object that is changed.

20. The risk management system of claim 19 wherein the computer processing system is configured to execute a user-defined process upon the occurrence of an event.

21. The risk management system of claim 19 wherein the event is one that occurs outside of the risk management system.

22. The risk management system of claim 19 wherein the event is one that occurs within the risk management system.

23. The risk management system of claim 22 wherein the event is based on the passage of a period of time.

24. The risk management system of claim 19 wherein the relationship is represented by a link object.

25. The risk management system of claim 19 wherein the computer processing system is configured to define the risk software objects.

26. The risk management system of claim 19 wherein the computer processing system is configured grant a user exclusive access to a risk software object that the user is changing.

27. The risk management system of claim 19 wherein the computer processing system is configured to generate and store an audit trail relating to accesses that are made to the risk software objects.

28. The risk management system of claim 19 wherein the computer processing system is configured to allow each risk software object to be changed a plurality of times by a user of the risk management system and to allow each risk software object to be reconstructed to each of its states prior to each of the changes.

29. The risk management system of claim 19 wherein:
the memory system includes a plurality of templates, wherein each of the templates represents a particular type of risk; and
the computer processing system is configured to:
receive input from a user of the risk management system;
in response to the input, define a new risk software object based on a template from the plurality of templates, wherein a relationship is established between a workflow process and a particular type of risk software object as defined by the template, and wherein the new risk software object that is produced from the template is indirectly related to the workflow process.

30. The risk management system of claim 29 wherein:
the template was based on one of the risk software objects; and
the computer processing system is configured to create a template based on one of the risk software objects.

31. Computer-readable media containing programming that, when installed in a computer processing system, allows that computer processing system to:
define a risk software object developed with object-oriented programming to contain attributes and methods, wherein the attributes of the risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and other risk software objects, non-risk software objects, workflow processes, wherein the methods include methods that relate to rules, wherein a method comprises a subroutine that initiates, alters or interrupts one or more processes;
define a plurality of workflow processes relating to the enterprise;
establish the relationships between the risk software objects and the workflow processes, wherein a relationship is represented as an attribute of the risk software object that is related by the relationship; and
manage the risks using the risk software objects, the workflow processes and the relationships by:
causing a change in one of the risk software objects upon the occurrence of an event; and
in response to the change in the risk software object, triggering the workflow process, wherein the workflow process is specified by a method associated with the risk software object that is changed.

32. The computer-readable media of claim 31 containing programming that, when installed in a computer processing system, allows that computer processing system to:
store a plurality of templates, wherein each of the templates represents a particular type of risk;
receive input from a user of the risk management system;
in response to the input, define a new risk software object based on a template from the plurality of templates, wherein a relationship is established between a workflow process and a particular type of risk software object as defined by the template, and wherein the new risk software object that is produced from the template is indirectly related to the workflow process.

33. A risk-management system comprising:
a content management system;
a process management system;
a computer processing system configured to allow risks to be defined as risk software objects developed with object-oriented programming to contain attributes and methods, wherein the attributes of a risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and other risk software objects, non-risk software objects, and workflow processes;
a records management system, wherein the computer processing system is configured to allow the risk software objects to be declared as records that are managed by the records management system;
wherein the computer processing system is configured to:
monitor values of one or more attributes of one or more risk software objects; and
in response to the monitoring and based on one or more pre-defined rules or conditions, initiate a process within the process management system that manages at least one record in the records management system that is related to an attribute of one of the risk software objects in response to a change in that attribute.

34. The risk management system of claim 33 wherein the content and process management systems are part of a single, integrated system.

35. The risk management system of claim 33 wherein the content and process management systems are separate systems.

36. The risk management system of claim 33 further including a document management system and wherein the computer processing system is further configured to allow the risks that are defined as risk software objects to be related to the document management system.

37. The risk management system of claim 33 wherein the process that manages at least one record causes the at least one record to be added to the records management system.

38. The risk management system of claim 33 wherein the process that manages at least one record causes the at least one record to be classified within the records management system.

39. The risk management system of claim 33 wherein the process that manages at least one record causes the at least one record to be managed by a pre-defined retention period.

40. The risk management system of claim 33 wherein the process management system includes a workflow management system.

41. A risk management system comprising:
a memory system containing:
a plurality of templates, wherein each of the templates represents a particular type of risk;
a plurality of risk software objects developed with object-oriented programming to contain attributes and methods, wherein the attributes of a risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and another component, wherein the methods include methods that relate to rules, status changes, events, and updates, wherein a method comprises a subroutine that initiates, alters or interrupts one or more processes; and multiple relationships between two of the risk software objects that were defined by one or more users of the risk management system, wherein a relationship is represented as an attribute of the risk software object that is related by the relationship; and a computer processing system including a processor and configured to manage the risk software objects and the multiple relationships by:

defining a new risk software object based on a template from the plurality of templates, wherein a relationship is established between a workflow process and a particular type of risk software object as defined by the template, and wherein the new risk software object that is produced from the template is indirectly related to the workflow process;

causing a change in the new risk software object upon the occurrence of an event; and in response to the change in the new risk software object, triggering a workflow process, wherein the workflow process is specified by a method associated with the new risk software object that is changed.

42. Computer-readable media containing programming that, when installed in a computer processing system, allows that computer processing system to:

store a plurality of templates, wherein each of the templates represents a particular type of risk;

define a risk software object developed with object-oriented programming to contain attributes and methods, wherein the attributes of the risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and another component, wherein the methods include methods that relate to rules, status changes, events, and updates, wherein a method comprises a subroutine that initiates, alters or interrupts one or more processes;

establish under the direction of one or more users of the risk management system multiple relationships between two of the risk software objects, wherein a relationship is represented as an attribute of the risk software object that is related by the relationship; and manage the risks using the software objects and the multiple relationships by:

defining a new risk software object based on a template from the plurality of templates, wherein a relationship is established between a workflow process and a particular type of risk software object as defined by the template, and wherein the new risk software object that is produced from the template is indirectly related to the workflow process;

causing a change in the new risk software object upon the occurrence of an event; and in response to the change in the new risk software object, triggering a workflow process, wherein the workflow process is specified by a method associated with the new risk software object that is changed.

43. A risk management system comprising:

a memory system containing a plurality of risk software objects developed with object-oriented programming to contain attributes and methods, wherein the attributes of a risk software object include a description of the risk, a type of the risk, security information relating to the risk software object, an identification of owners of the risk, audit information relating to the risk software object, electronic signatures procured in connection with the risk software object, notifications to be issued upon a change in an aspect of the risk software object, information about losses that have been sustained in connection with the risk, information indicative of the value of the risk, and relationships between the risk software object and other components, wherein the methods include methods that relate to rules, wherein a method comprises a subroutine that initiates, alters or interrupts one or more processes; and a computer processing system including a processor and configured to allow:

a user to be granted exclusive access to a risk software object that the user is changing;

each risk software object to be changed a plurality of times by a user of the risk management system and to allow each risk software object to be reconstructed to each of its states prior to each of the changes, wherein the computer processing system keeps track of information including who access each risk software object, when the risk software object is modified, who authorizes the modification, who generates documentation related to the risk software object, and when these events take place, wherein the tracked information is reported for auditing and compliance reporting purposes; and the access users of the risk management system have to the risk software objects to be regulated.

44. Computer-readable media containing programming that, when installed in a computer processing system, allows that computer processing system to:

define a risk software object that is developed with object-oriented programming to contain attributes and methods, wherein the attributes of the risk software object include at least one of a description of the risk, a type of the risk, an identification of owners of the risk, audit information relating to the risk software object, electronic signatures procured in connection with the risk software object, notifications to be issued upon a change in an aspect of the risk software object, information about losses that have been sustained in connection with the risk, information indicative of the value of the risk, security information relating to the risk software object, and relationships between the risk software object and other components, wherein the methods include methods that relate to rules, wherein a method comprises a subroutine that initiates, alters or interrupts one or more processes;

grant a user exclusive access to one of the risk software objects that the user is changing, wherein the computer processing system keeps track of information including who access each risk software object, when the risk software object is modified, who authorizes the modification, who generates documentation related to the risk software object, and when these events take place, wherein the tracked information is reported for auditing and compliance reporting purposes;

reconstruct one of the risk software objects that was changed by a user to its state prior to the change; and block a user from access to some but not all of the risk software objects.

45. A process for managing a plurality of risks associated with an enterprise in a computer processing system comprising:

defining, with a computer processing system, a risk software object developed with object-oriented programming to contain attributes and methods, wherein the attributes of the risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and other risk software objects, non-risk software objects, and workflow processes, wherein the methods include methods that relate to rules, status changes, events, and updates, wherein a method comprises a subroutine that initiates, alters or interrupts one or more processes;

defining each of a plurality of non-risk software objects to represent something related to the enterprise other than a risk, wherein the non-risk software objects include persons, policies, assets, losses, transactions, documents, relationships, and workflow processes;

establishing relationships between the risk software objects and the non-risk software objects, wherein a relationship is represented as an attribute of the risk software object that is related by the relationship; and managing the risks using the software objects and the relationships by:

causing a change in one of the risk software objects upon the occurrence of an event; and in response to the change in the risk software object, triggering a workflow process, wherein the workflow process is specified by a method associated with the risk software object that is changed.

46. The process of claim 45 further comprising:
displaying relationships to a first software object; and
in response to user selection from the display, navigating to a second software object based on its relationship to the first software object.

47. The process of claim 45 further comprising:
storing a plurality of templates, wherein each of the templates represents a particular type of risk; and
receiving input from a user of the risk management system;
in response to the input, defining a new risk software object based on a template from the plurality of templates, wherein a relationship is established between a workflow process and a particular type of risk software object as defined by the template, and wherein the new risk software object that is produced from the template is indirectly related to the workflow process.

48. A process for managing a plurality of risks associated with an enterprise using a computer processing system comprising:

defining, with a computer processing system, a risk software object developed with object-oriented programming to contain attributes and methods, wherein the attributes of the risk software object include a description of the risk, a type of the risk, an identification of owners of the risk, audit information relating to the risk software object, electronic signatures procured in connection with the risk software object, notifications to be issued upon a change in an aspect of the risk software object, security information relating to the risk software object, information about losses that have been sustained in connection with the risk, information indicative of the value of the risk, and relationships between the risk software object and other risk software objects, non-risk software objects, and workflow processes, wherein the methods include methods that relate to rules, wherein a method comprises a subroutine that initiates, alters or interrupts one or more processes;

defining a plurality of workflow processes relating to the enterprise;

establishing relationships between the risk software objects and the workflow processes, wherein a relationship is represented as an attribute of the risk software object that is related by the relationship; and managing the risks using the risk software objects, the workflow processes and the relationships by:

causing a change in one of the risk software objects upon the occurrence of an event; and in response to the change in the risk software object, triggering the workflow process, wherein the workflow process is specified by a method associated with the risk software object that is changed.

49. The process of claim 48 further comprising:
storing a plurality of templates, wherein each of the templates represents a particular type of risk;
receiving input from a user of the risk management system;
in response to the input, defining a new risk software object based on a template from the plurality of templates, wherein a relationship is established between a workflow process and a particular type of risk software object as defined by the template, and wherein the new risk software object that is produced from the template is indirectly related to the workflow process.

50. A process for managing a plurality of risks associated with an enterprise comprising:

storing, with a computer processing system, a plurality of templates, wherein each of the templates represents a particular type of risk;

defining a risk software object developed with object-oriented programming to contain attributes and methods, wherein the attributes of the risk software object include a description of the risk, a type of the risk, an identification of owners of the risk, audit information relating to the risk software object, electronic signatures procured in connection with the risk software object, notifications to be issued upon a change in an aspect of the risk software object, information about losses that have been sustained in connection with the risk, information indicative of the value of the risk, and relationships between the risk software object and another component, wherein the methods include methods that relate to rules, status changes, events, and updates, wherein a method comprises a subroutine that initiates, alters or interrupts one or more processes;

establishing under the direction of one or more users of the risk management system multiple relationships between two of the risk software objects, wherein a relationship is represented as an attribute of the risk software object that is related by the relationship; and managing the risks using the software objects and the multiple relationships by:
- defining a new risk software object based on a template from the plurality of templates, wherein a relationship is established between a workflow process and a particular type of risk software object as defined by the template, and wherein the new risk software object that is produced from the template is indirectly related to the workflow process;
- causing a change in the new risk software object upon the occurrence of an event; and
- in response to the change in the new risk software object, triggering a workflow process, wherein the workflow process is specified by a method associated with the new risk software object that is changed.

51. A process for managing a plurality of risks associated with an enterprise comprising:

defining, with a computer processing system, a risk software object that is developed with object-oriented programming to contain attributes and methods, wherein the attributes of the risk software object include at least one of a description of the risk, a type of the risk, security information relating to the risk software object, an identification of owners of the risk, audit information relating to the risk software object, electronic signatures procured in connection with the risk software object, notifications to be issued upon a change in an aspect of the risk software object, information about losses that have been sustained in connection with the risk, information indicative of the value of the risk, and relationships between the risk software object and other components, wherein the methods include methods that relate to rules, wherein a method comprises a subroutine that initiates, alters or interrupts one or more processes;

granting a user exclusive access to one of the risk software objects that the user is changing, wherein the computer processing system keeps track of information including who access each risk software object, when the risk software object is modified, who authorizes the modification, who generates documentation related to the risk software object, and when these events take place, wherein the tracked information is reported for auditing and compliance reporting purposes;

reconstructing one of the risk software objects that was changed by a user to its state prior to the change; and blocking a user from access to some but not all of the risk software objects.

* * * * *